(12) United States Patent
Girardeau

(10) Patent No.: US 9,791,310 B2
(45) Date of Patent: Oct. 17, 2017

(54) VIBRATION-SENSING FIELD UNIT

(71) Applicant: UPTIME SOLUTIONS, INC., Jacksonville, FL (US)

(72) Inventor: James Girardeau, Austin, TX (US)

(73) Assignee: UPTIME SOLUTIONS, Jacksonville, FL (US)

( * ) Notice: Subject to any disclaimer, the term of this patent is extended or adjusted under 35 U.S.C. 154(b) by 181 days.

(21) Appl. No.: 14/452,385

(22) Filed: Aug. 5, 2014

(65) Prior Publication Data

US 2015/0355216 A1    Dec. 10, 2015

Related U.S. Application Data

(60) Provisional application No. 62/010,008, filed on Jun. 10, 2014.

(51) Int. Cl.
*G01H 1/00* (2006.01)
*G01H 11/08* (2006.01)

(52) U.S. Cl.
CPC ............... *G01H 1/00* (2013.01); *G01H 11/08* (2013.01)

(58) Field of Classification Search
CPC ....................................................... G01H 1/00
USPC .................................................. 73/862.192
See application file for complete search history.

(56) References Cited

U.S. PATENT DOCUMENTS

| | | | | |
|---|---|---|---|---|
| 6,694,285 B1* | 2/2004 | Choe | ...................... | G01H 1/003 702/182 |
| 8,427,176 B2* | 4/2013 | Stein | ....................... | G01D 5/48 324/639 |
| 8,979,758 B2* | 3/2015 | Stein | .................... | A61B 5/0031 600/438 |
| 2012/0078544 A1* | 3/2012 | Lynch | ................... | B64C 27/008 702/56 |
| 2012/0187810 A1* | 7/2012 | Iwamoto | ................. | G06F 1/166 312/223.2 |
| 2013/0278377 A1 | 10/2013 | Slupsky et al. | | |
| 2014/0000921 A1* | 1/2014 | Vanko | ...................... | G01C 9/00 173/11 |
| 2014/0092763 A1 | 4/2014 | De Carne | | |
| 2014/0297067 A1* | 10/2014 | Malay | .................... | G01C 9/005 701/4 |
| 2015/0082890 A1* | 3/2015 | Pant | ..................... | G01N 29/265 73/618 |

OTHER PUBLICATIONS

"What is an Accelerometer?", <http://www.futureelectronics.com/en/sensors/accelerometers.aspx>, Accessed Aug. 5, 2014, 3 pages.
(Continued)

*Primary Examiner* — Clayton E LaBalle
*Assistant Examiner* — Dennis Hancock

(57) ABSTRACT

A vibration-sensing field unit includes a base with at least one accelerometer, and a body mounted to the base. The base is composed essentially of a first material, while the body is composed essentially of a second material that is more flexible than the first material to reduce a vibration at the accelerometer caused by a mass supported by the body. In another embodiment, a vibration-sensing field unit includes at least one accelerometer and at least one ultrasonic transducer.

20 Claims, 5 Drawing Sheets

(56) References Cited

OTHER PUBLICATIONS

"Ask the Expert: Understanding Piezoelectric Accelerometer Resonance Frequency", Meggitt Sensing Systems, <http://www.endevco.com/news/archivednews/2011/06/ask-the-expert-june.html>, Accessed Aug. 5, 2014, 2 pages.

"What are Accelerometers?", Omega Global, <http://www.omega.com/prodinfo/accelerometers.html>, Accessed Aug. 5, 2014, 3 pages.

"Vibration", Wikipedia, <http://en.wikipedia.org/wiki/vibration>, Accessed Aug. 5, 2014, 15 pages.

* cited by examiner 300-300

VIBRATION-SENSING FIELD UNIT

CROSS-REFERENCE TO RELATED APPLICATION

The present disclosure claims priority to U.S. Patent Application Ser. No. 62/010,008, entitled "Vibration-Sensing Field Unit" and filed on Jun. 10, 2014, the entirety of which is incorporated by reference herein.

BACKGROUND

Field of the Disclosure

The present disclosure relates generally to industrial facilities and, more particularly, to monitoring of machine parameters in industrial facilities.

Description of the Related Art

Industrial facilities, such as manufacturing facilities, laboratories, research facilities, refineries, other structures, and the like, often use sensors to monitor machine parameters. For example sensors may be used to measure machine parameters such as vibration, acceleration, velocity, sound, electric field, speed, torque, displacement, and the like. It is often desirable to combine multiple sensors into a single device to increase functionality without requiring the installation and maintenance of multiple devices. However, combining sensors may create additional issues. For example, vibration sensors are limited by their mass since larger masses have lower resonance frequencies. Consequently, the mass of vibration sensor devices is often kept below a threshold, limiting the size and amount of components including power source. This in turn limits the operational time of the sensor devices on a given battery charge, resulting in delays, transmission errors, sensor device failures, frequent battery replacement, inefficiencies, greater expense, and safety concerns.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
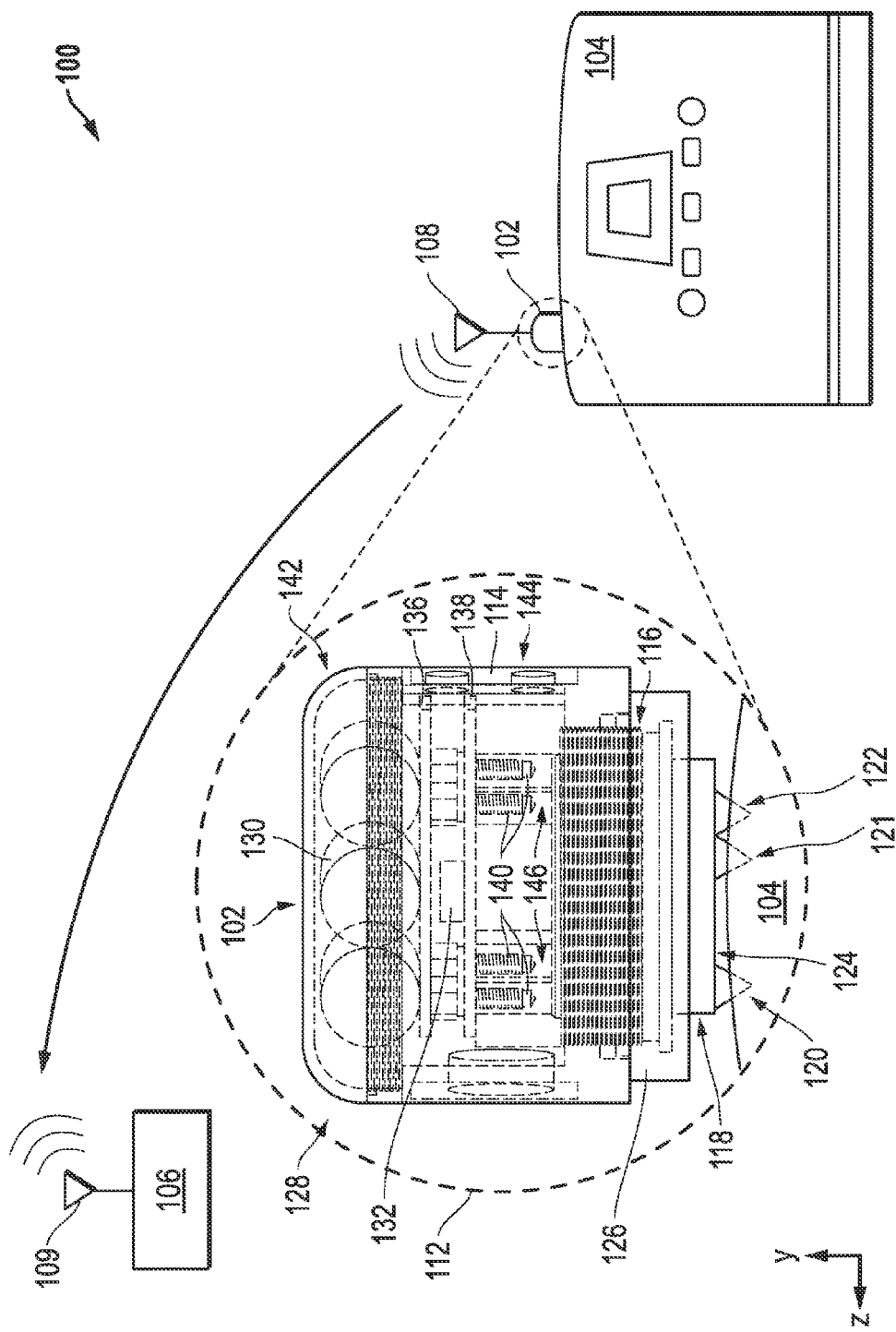
FIG. 1 is a block diagram illustrating an industrial facility vibration-sensing field unit system in accordance with some embodiments.

FIGS. 1-6 illustrate example implementations of a vibration-sensing field unit in accordance with some embodiments. The vibration-sensing field unit is used to monitor one or more machine parameters of at least one machine housed in a facility (which itself may be a machine). The machine parameters may include, for example, temperature, vibration, stress, acceleration, velocity, pressure, liquid level, gas level, gas concentration, sound, electric field, speed, torque, displacement, and any other information that may directly or indirectly indicate the status of a machine or a part of a machine, or an environment in which a machine is located.

The vibration-sensing field unit comprises a base comprising at least one accelerometer to sense vibrations, and a body mounted to the base. The body of the vibration-sensing field unit supports a mass, for example, a power supply, additional sensors, other electronics, and the like. The body is composed essentially of a flexible material, for example, polytetrafluoroethylene (PTFE) (commonly available under the tradename Teflon™), polypropylene, rubber, soft plastic, acetal resin (commonly available under the tradename Delrin™), or the like, while the base is composed essentially of an inflexible material, for example, steel, stainless steel, aluminum, hard plastic, or the like. In some cases the body and base may both be made of metal or plastic, where the body is substantially more flexible than the base. The flexible material of the body allows the field unit to isolate the mass from the accelerometer, such that the accelerometer is able to sense resonance frequencies higher than the resonance frequency of the mass. Such a mass damping structure allows for vibration-sensing field units with greater functionality, since additional mass can be added in the form of additional sensors, additional electronics, power supply, and the like without affecting the accuracy of accelerometer.

As used herein, the term "essentially" is defined as largely but not necessarily wholly that which is specified, and may include what is specified, as understood by a person of ordinary skill in the art. That is, if an object is composed essentially of a material, the object may be composed entirely of the material, or the object may be composed of a combination of the material and other materials such that the object is composed largely of the material.

As used herein, the term "machine" refers to a structure or combination of structures subject to environmental changes or mechanical forces, either self-generated or externally applied. Structures with self-generated mechanical forces include, for example boilers, compressors, generators, transformers, industrial robots, rotating bearings, mills, lathes, grinders, saws, welders, ovens, mining equipment, and the like. Structures with externally applied mechanical forces include, for example, bridges and other spans, buildings, cranes, boat hulls, highways, and the like. Moreover, it will be appreciated that some machines may comprise structures subject to both self-generated mechanical forces and externally-applied mechanical forces.

FIG. 1 illustrates an industrial facility vibration-sensing field unit system 100 for wireless transmission of machine parameter data from a vibration-sensing field unit 102 detecting at least one machine parameter of a machine 104 in an industrial facility to a base station 106 in accordance with some embodiments. In some embodiments the vibration-sensing field unit 102 may detect any of a variety of machine parameters, including, for example, temperature, vibration, stress, acceleration, velocity, pressure, liquid level, gas level, gas concentration, sound, electric field, speed, torque, displacement, and any other information that may directly or indirectly indicate the status of a machine or a part of a machine, or an environment in which a machine is located.

The vibration-sensing field unit 102 transmits information related to machine parameters of the machine 104 to the base station 106 over a wireless network via a wireless transmitter 108 at the vibration-sensing field unit 102 and a wireless receiver 109 at the base station 106. In at least one embodiment, the wireless transmitter 108 and the wireless receiver 109 comprise wireless transceivers, such that the base station 106 may also transmit information over the wireless network to the vibration-sensing field unit 102. In at least one embodiment, the wireless transmitter 108 is housed within the field unit 102. Any of a variety of radio technologies may be implemented by the wireless transmitter 108 and wireless receiver 109, such as an IEEE 802.11x (WiFi)-based technology, 900 megahertz (MHz), 268 MHz, or 2.4 gigahertz (GHz) technology, a Global System for Mobile Communications (GSM) technology, a General Packet Radio Service (GPRS) technology, and the like.

As can be seen in detail view 112, the vibration-sensing field unit 102 comprises a body 114 mounted to a base 116. In at least one embodiment, the body 114 and the base 116 comprise corresponding threads such that the body 114 is mounted to the base 116 by threading the body 114 onto the base 116. In at least one embodiment, the vibration-sensing field unit 102 further comprises a mount 118 to facilitate mounting the vibration-sensing field unit 102 to the machine 104. For example, in the illustrated embodiment, the mount 118 comprises three legs 120, 121, 122 oriented to support mounting to a variety of surfaces presented by machine bodies, including uneven surfaces and curved surfaces. In at least one embodiment, the base further comprises a hole at a bottom surface 124 of the mount 118 to receive a bolt or otherwise facilitate mounting of the vibration-sensing field unit 102 to the machine 104. The mount 118 may be rotatable about the y-axis (in the z-x plane) to facilitate positioning of the legs 120, 121, 122 or other fasteners on the machine 104. In the illustrated embodiment, a lock nut 126 fastens the mount 118 to the base 116. In some embodiments, the lock nut 126 fastens the mount 118 to the body 114. Further, in at least one embodiment, once the mount 118 has been positioned on the machine 104, the lock nut 126 locks the position of the mount 118 by preventing further rotation of the mount 118 about the y-axis.

The body 114 houses a mass 128 comprising any of a variety of additional components. In the illustrated embodiment, the mass 128 comprises a power supply 130 and electronics 132. While, in the illustrated embodiment, the power supply 130 comprises batteries, in other embodiments, the power supply 130 may comprise any power source. The electronics 132 may comprise, for example, one or more sensors, a circuit board (e.g., a printed circuit board (PCB)), a wireless transmitter, a radio, a memory store, or the like. In some embodiments, the mass 128 is supported by one or more boards 134, 136. For example, in the illustrated embodiment, the power supply 130 is supported by the battery board 136, and the electronics 132 are supported by the electronics board 138. In other embodiments, a single board may be used, or more than two boards may be used. Further in some embodiments, the electronics 132 and the power supply 130 may be supported by the same board, or each of the electronics 132 or the power supply 130 may be distributed among multiple boards. A standoff may be used, for example, a plurality of metal or nylon bolts 140, to separate the boards 136, 138 and create space for the electronics 132 (or in some embodiments the power supply 130). In the illustrated embodiment, the body 114 further comprises a cover 142 that allows access to at least a portion of the mass 128. For example, the cover 142 may be removable, or otherwise open to allow access to the power supply 130 or the electronics 132 to facilitate maintenance or replacement.

The vibration-sensing field unit 102 uses an accelerometer housed in the base 116 to monitor vibrations of the machine 104. Vibration in a machine may indicate imbalances, meshing of gear teeth, uneven friction, worn out or failing components, or the like, and may result in unwanted noise, wasted energy, increased wear, machine or part failure, or the like. As such, it is advantageous to identify and remedy the cause of vibrations early. Generally, early signs of unwanted vibrations are much more subtle, having higher frequencies than when the vibration is allowed to continue. As such, the higher the frequency that the vibration-sensing field unit 102 is able to sense, the better chance of identifying early signs of vibration in the machine 104. Accelerometers are only able to sense frequencies lower than the resonance frequency of the accelerometer. The resonance frequency is the frequency at which the accelerometer resonates or rings; that is, the point in frequency within an accelerometer's frequency response where maximum sensitivity is outputted.

The resonance frequency of an accelerometer may be modeled using Equation 1 (EQ. 1):

$$f = \frac{1}{2\pi}\sqrt{\frac{k}{m}} \qquad \text{EQ. 1}$$

where f represents the resonance frequency for the accelerometer device having a mass m, and a stiffness factor k. As is indicated by Equation 1 (EQ. 1), the greater the mass m, the lower the resonance frequency f. As such, vibration-sensing devices must maintain a low mass to avoid raising the resonance frequency, thereby reducing the sensitivity of the accelerometer. To achieve this, vibration-sensing devices are often kept very small in size, foregoing increased functionality provided by additional components to avoid additional mass.

The vibration-sensing field unit 102 of the illustrated embodiment allows for additional mass (and therefore additional functionality) while still maintaining a high resonance frequency at the accelerometer by employing a mass damping system 144 at the body 114 of the vibration-sensing field unit 102. While the base 116 of the vibration-sensing field unit 102 is composed essentially of an inflexible material, the body 114 of the vibration-sensing field unit 102 is composed essentially of a flexible material (the flexibleness or inflexibleness of each material being relative to the other). For example, the base 116 of the vibration-sensing field unit 102 may be composed essentially of steel, stainless steel, aluminum, hard plastic, or the like, while the body 114 of the vibration-sensing field unit 102 may be composed essentially of PTFE, polypropylene, rubber, acetal resin, soft plastic, or the like.

The flexible material of the body 114 supports the mass 128, so as to isolate the mass 128 from the accelerometer at the base 116 of the vibration-sensing field unit 102. Further, in some embodiments, the mass damping system 144 employs one or more shock-absorbing pillars 146 composed essentially of the flexible material so as to absorb the vibration of the mass 128, preventing the vibrations of the mass 128 from affecting the resonance frequency of the accelerometer at the base 116 of the vibration-sensing field unit 102. While in the illustrated embodiment each of the plurality of bolts 140 extends into each of the one or more shock-absorbing pillars 146, in other embodiments the plurality of bolts or other standoff and the one or more shock-absorbing pillars 146 may be arranged differently.

Conventionally, the resonance frequency of the accelerometer is affected by the total mass of the vibration-sensing field unit, including the power supply, electronics, other structures, etc. In contrast, in the illustrated embodiments, the accelerometer at the base 116 of the vibration-sensing field unit 102 will maintain a higher resonance frequency since it will be isolated from the lower resonance frequency of the mass 128 by the mass damping system 144 at the body 114 of the vibration-sensing field unit 102. As such, the vibration-sensing field unit 102 may be customized to provide additional functionality without affecting the effectiveness of the accelerometer. For example, in some embodiments the vibration-sensing field unit 102 comprises an expansion port, an indicator light, an antenna connector, an ultrasonic transducer, or the like.

Figure 2:
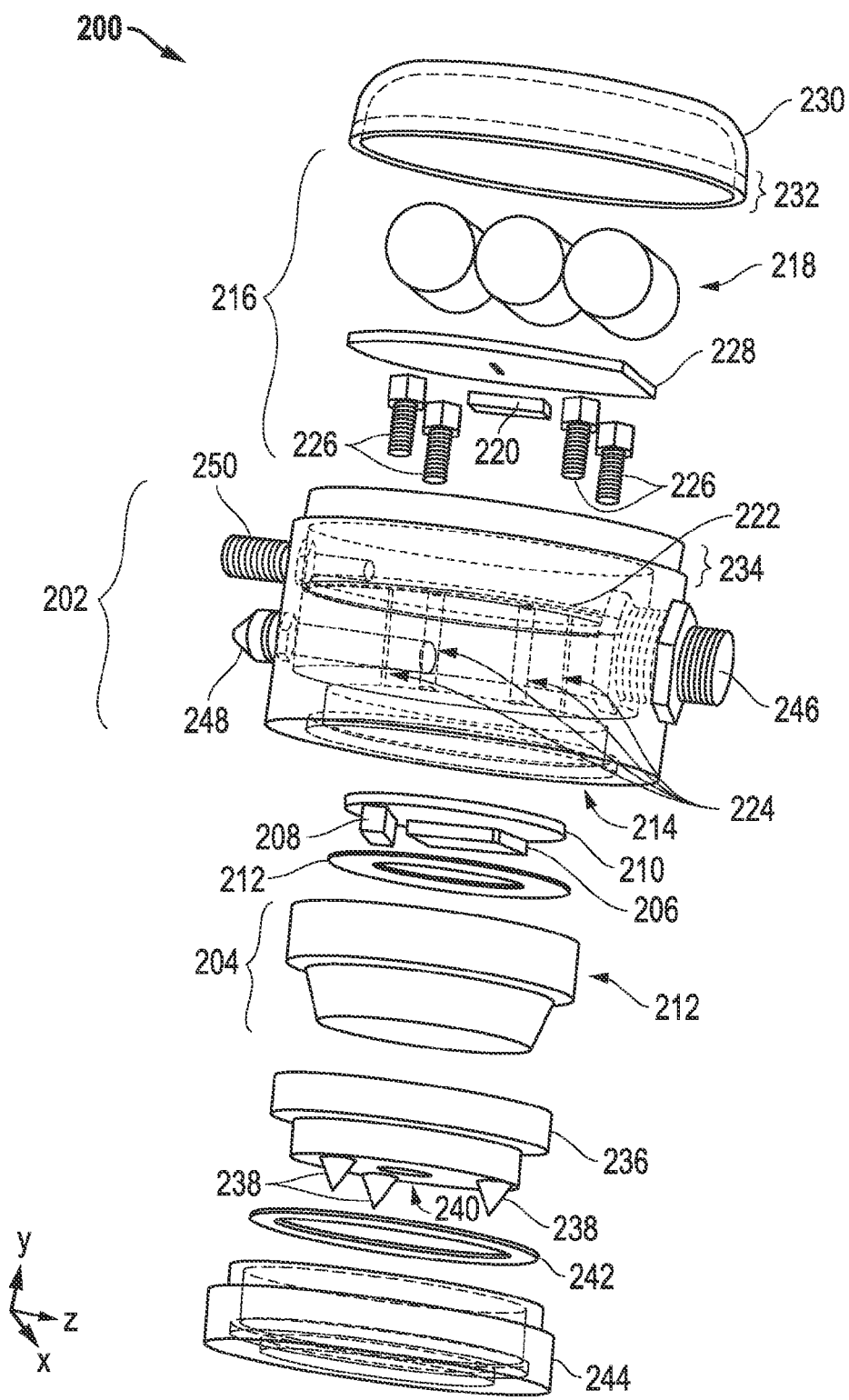
FIG. 2 is an exploded perspective view of a vibration-sensing field unit in accordance with some embodiments.

FIG. 2 illustrates an exploded perspective view of a vibration-sensing field unit 200 comprising a body 202 mountable to a base 204 in accordance with some embodiments. The base 204 is configured to receive at least one accelerometer 206 and at least one ultrasonic transducer 208. The addition of the at least one ultrasonic transducer 208 facilitates early detection of certain machine issues that often produce detectible sounds prior to detectible vibrations resulting from, for example, metal deterioration, early signs of bearing failures, fluid or air/gas leaks, and the like.

The accelerometer 206 and ultrasonic transducer 208 may be seated in the base 204. In the illustrated embodiment, the accelerometer 206 and the ultrasonic transducer 208 are mounted to a plate 210 used in combination with an O-ring 212 to position the accelerometer 206 and the ultrasonic transducer 208 in the base 204. The base 204 may comprise a shelf or other feature such that the O-ring rests on the shelf, and the plate 210 rests on the O-ring 212, such that the accelerometer 206 is suspended within a cavity of the base 204. In the illustrated embodiment, the base 204 comprises threads 213 corresponding to threaded opening 214 of the body 202, such that the body 202 may be threaded onto the base. In other embodiments, the body 202 may be mounted onto the base 204 using any of a variety of mounting techniques and fasteners. Further, the base 204 and the mount 236 may include co-aligned acoustic channels (not shown) to focus ultrasonic noise onto the ultrasonic transducer 208.

The base 204 is composed essentially of an inflexible material, while the body 202 is composed essentially of a flexible material ("flexible" and "inflexible" for each material being relative to the other material). For example, the base 204 of the vibration-sensing field unit 200 may be composed essentially of steel, stainless steel, aluminum, hard plastic, or the like, while the body 202 of the vibration-sensing field unit 200 may be composed essentially of PTFE, polypropylene, rubber, soft plastic, or the like. As another example, the base 204 may be composed of a relatively inflexible metal, such as stainless steel, while the body 202 may be composed of a relatively flexible metal, such as aluminum. The difference in flexibility between the base 204 and the body 202 allows the body 202 to serve as a mass damping system, isolating the accelerometer 206 from vibrations caused by a mass 216.

In the illustrated embodiment, the mass 216 comprises power supply 218, electronics 220, and supporting structures. However, in other embodiments, the mass 216 may comprise any of a variety of components. To illustrate, the mass 216 further may include a piezoelectric, thermoelectric, or peltier cooling system on at least one of the boards, whereby the cooling system cools the field unit 200 so as to allow it to operate in high temperature environments. In such embodiments, the cooling system may use the body 202 as a radiator for dissipating heat. The electronics 220 rest on an electronics board 222 supported by one or more shock-absorbing pillars 224 formed in the body 202. In the illustrated embodiment, a plurality of bolts 226 extend through holes in the electronics board 222 into the one or more shock-absorbing pillars, such that the heads of the bolts 226 create an offset from the electronics board 222 allowing space for the electronics 220. The electronics 220 may comprise, for example, one or more sensors, a circuit board (e.g., a PCB), a wireless transmitter, a radio, a memory store, or the like. The electronics 220 may implement systems for processing signaling from the one or more sensors of the vibration-sensing field unit 200 or sensors externally coupled to the field unit 200 via an expansion port, as well as systems for transmitting wirelessly transmitting representations of such processing. For example, the electronics 220 may include a digital signal processing system, a decimation unit, an anti-alias filter, a fast Fourier transform (FFT) processor, and the like.

A battery board 228 rests on the heads of the plurality of bolts 226, and supports the power supply 218. While the power supply 218 in the illustrated embodiment depicts batteries, in other embodiments, the power supply 218 may comprise any power source. Additionally, while two boards 222, 228 are depicted in the illustrated embodiment, other embodiments may include more or less boards. Further, the power supply 218 and the electronics 220 may rest on the same board, or may be distributed in any manner over multiple boards.

A cover 230 is removably coupled to the body 202 to protect the power supply 218 and electronics 220. In the illustrated embodiment, the cover 230 comprises threads 232 corresponding to threads 234 of the body 202, such that the cover 230 may be threaded onto the body 202. A removable cover 230 allows the power supply 218 or the electronics 220 to be accessed for maintenance, replacement, or otherwise. While threads 232, 234 are used to removably couple the cover 230 to the body 202, in other embodiments, other fasteners may be used. In at least one embodiment, the cover 230 is coupled to the body 202, such that the cover 230 may be opened (and the power supply 218 or electronics 220 accessed) while remaining attached to the body 202.

The base 204 may be seated in, or otherwise coupled to, a mount 236 to facilitate mounting of the vibration-sensing field unit 200 to a machine. In the illustrated embodiment, the mount 236 is depicted as comprising three legs 238 and a hole 240. The legs 238 allow the vibration-sensing field unit 200 to be mounted to any surface, including uneven surfaces and rounded surfaces. The hole 240 receives a bolt or other fastening component to secure the vibration-sensing field unit 200 to the machine. Additionally, in some embodiments, the mount 236, or a portion of the mount 236, is rotatable about the y-axis, such that the position of the legs 238 may be positioned according to the surface of the machine.

In the illustrated embodiment, an O-ring 242 and a lock nut 244 are fitted over the mount 236 and coupled to the base 204. In at least one embodiment, the lock nut 244 prevents the mount 236 from rotating further about the y-axis. In at least one embodiment, the lock nut 244 is threaded to correspond to the threads 213 of the base 204, such that the lock nut 244 may be threaded onto the base 204. In other embodiments, the mount 235 may be coupled to the base 204 using any of a variety of fasteners or coupling techniques.

In the illustrated embodiment, the body 202 of the vibration-sensing field unit 200 additionally comprises an expansion port 246, a light indicator 248, and an antenna connector 250. The expansion port 246 facilitates the use of additional components, channels, and features that may share the resources of the vibration-sensing field unit 200, including the power supply 218, and the electronics 220. The light indicator 248 may be any indicator, for example, a light-emitting diode (LED) indicator to indicate one or more functioning states of the vibration-sensing field unit 200. The light indicator may be used to indicate any of a variety of status information, such as through blink patterns indicating machine health, faults in the vibration-sensing field unit 200, current battery life, as well as the on/off status of the vibration-sensing field unit 200. The antenna connector 250 facilitates the connection of an antenna, transmitter, receiver, or transceiver. In other embodiments, the body 202, and the vibration-sensing field unit 200 as a whole may comprise any variety of additional connections or components to increase functionality (thereby adding mass) without affecting the function of the accelerometer 206.

Figure 3:
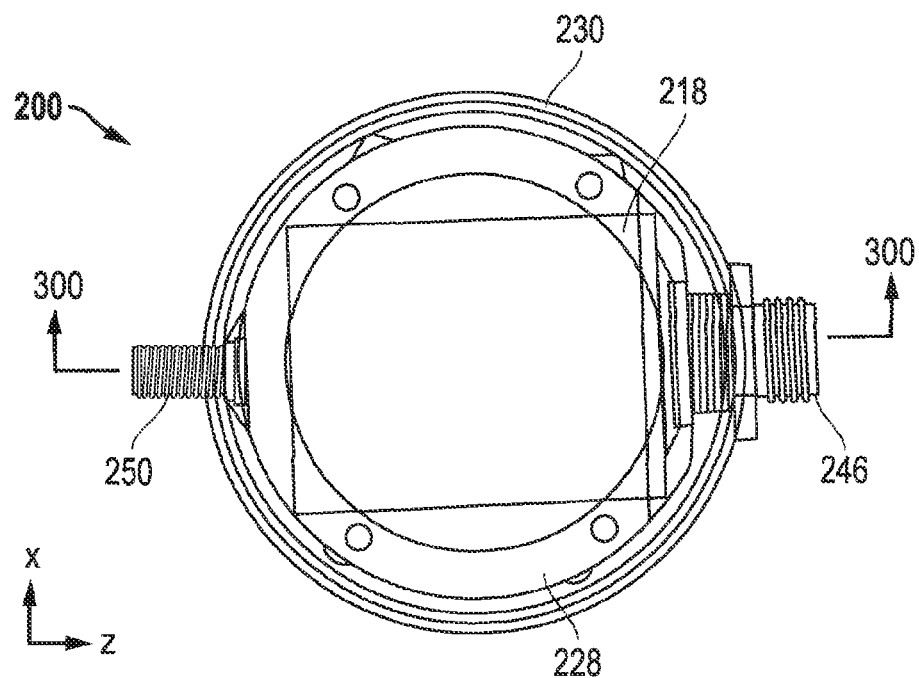
FIG. 3 is a top view of the vibration-sensing field unit of FIG. 2 in accordance with some embodiments.
Figure 4:
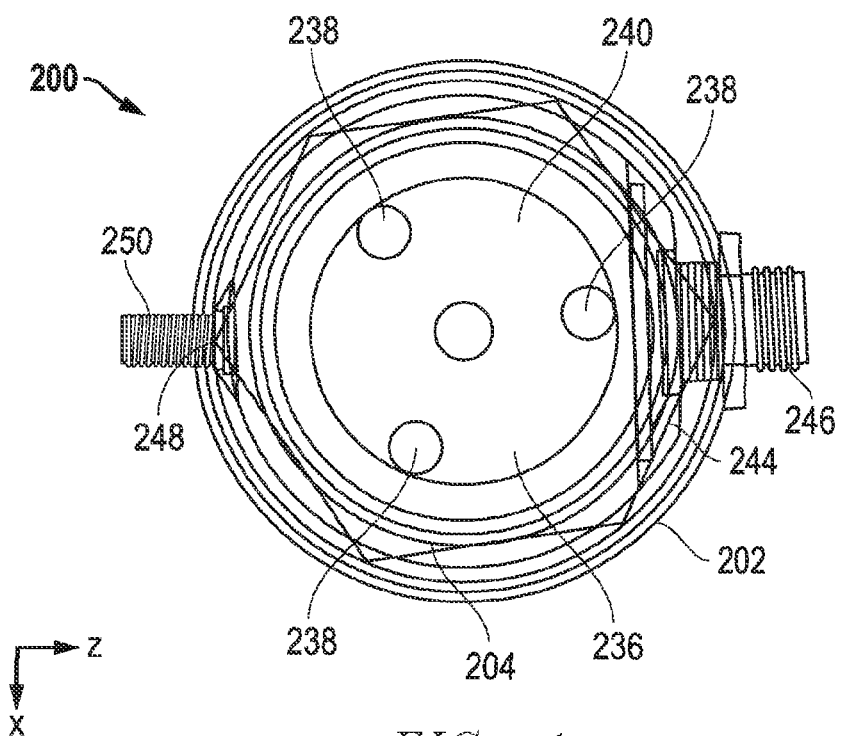
FIG. 4 is a bottom view of the vibration-sensing field unit of FIG. 2 in accordance with some embodiments.
Figure 5:
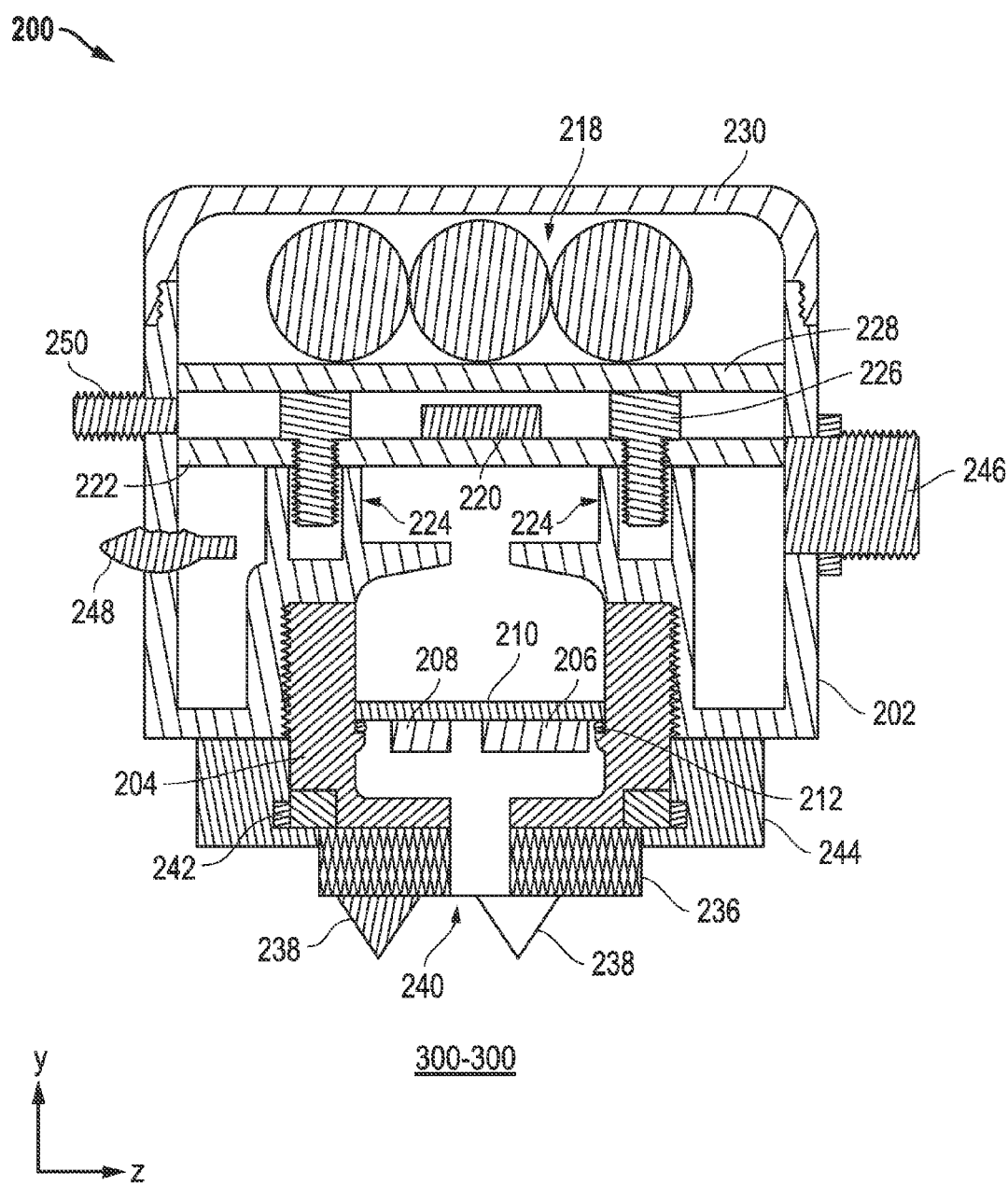
FIG. 5 is a cross-section view of the vibration-sensing field unit of FIGS. 2-4 in accordance with some embodiments.

FIGS. 3-5 illustrate a top view, bottom view, and cross-section view of the vibration-sensing field unit 200 of FIG. 2 in accordance with some embodiments. As illustrated in FIG. 3, the top view depicts the cover 230 covering the power supply 218, and the power supply 218 resting on the battery board 228. The expansion port 246 and antenna connector 250 are also depicted in the top view. The vibration-sensing field unit 200 is depicted in FIG. 3 with cutline 300-300, the cross-section of which is described in detail below with reference to FIG. 5. As illustrated in FIG. 4, the bottom view depicts the mount 236, including the legs 238, and the hole 240 to facilitate mounting of the vibration-sensing field unit 200 to a machine. Also depicted is the lock nut 244 for coupling the mount 236 to the base 204. Finally, a perimeter of the body 202 is depicted, along with the expansion port 246, the light indicator 248, and the antenna connector 250.

FIG. 5 is a cross-section view along cutline 300-300 of the vibration-sensing field unit 200 of FIG. 3 in accordance with some embodiments. As illustrated, the at least one accelerometer 206 and the at least one ultrasonic transducer 208 are mounted to the plate 210, which rests on the O-ring 212 within the base 204. The lock nut 244 and its O-ring 242 secure the mount 236 to the base 204. While a machine is not depicted in the illustrated embodiment, if the vibration-sensing field unit 200 is mounted to a machine, the legs 238 would come in contact with a surface of the machine, and a bolt or other fastener would secure the vibration-sensing field unit 200 to the machine via hole 240.

The base 204 is coupled to the body 202, which supports the mass 216 (see FIG. 2) comprising the electronics board 222, the electronics 220, the plurality of bolts 226 forming a standoff, the battery board 228, and the power supply 218. The body 202 additionally supports the expansion port 246, the light indicator 248, and the antenna connector 250. The one or more shock-absorbing pillars 224 absorb vibrations caused by the mass 216 providing additional mass damping. While the shock-absorbing pillars 224 are depicted as hollow columns, any of a variety of formations may be used to provide the shock absorption. Further, the placement and location of the mass 216 may differ in different embodiments. Additionally, the location within the base 204 of the at least one accelerometer 206 and the at least one ultrasonic transducer 208 may differ in different embodiments. Finally, the shape of the body 202, base 204, and vibration-sensing field unit 200 as a whole may differ in different embodiments, along with the location of any extension (e.g., expansion port 246, light indicator 248, antenna connector 250).

Figure 6:
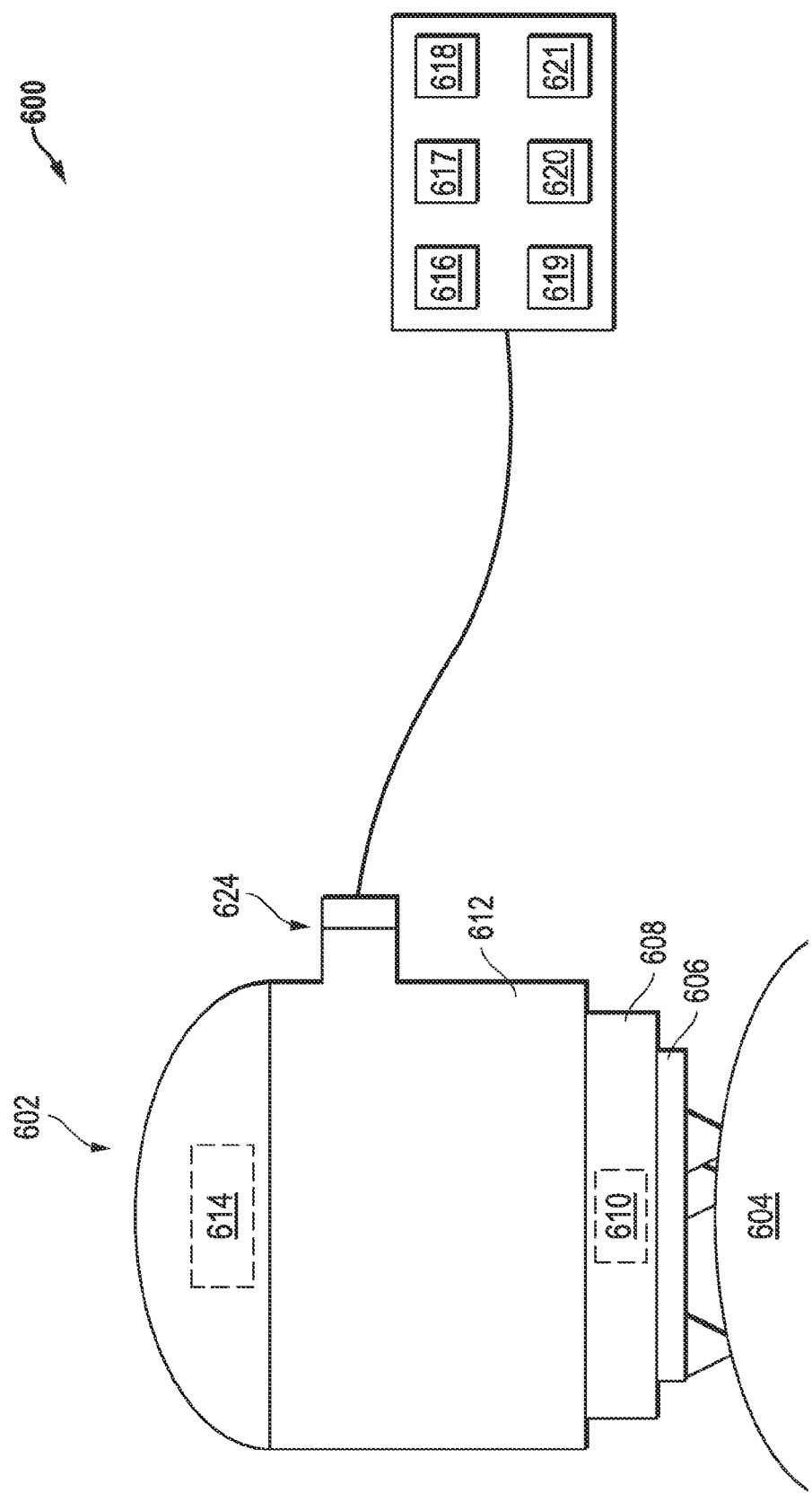
FIG. 6 is another example of an industrial facility vibration-sensing field unit system in accordance with some embodiments.

FIG. 6 is another example of a vibration-sensing field unit system 600 in accordance with some embodiments. A vibration-sensing field unit 602 is mounted to a machine 604 via a mount 606. The vibration-sensing field unit 602 further comprises a base 608 housing at least one accelerometer 610, and a body 612 coupled to the base 608. The body 612 supports a mass 614, for example, electronics, a power supply, or additional structures or components. The base 608 is composed essentially of an inflexible material, while the body 612 is composed essentially of a flexible material ("flexible" and "inflexible" for each material being relative to the other material). For example, the base 608 of the vibration-sensing field unit 602 may be composed essentially of steel, stainless steel, aluminum, hard plastic, or the like, while the body 612 of the vibration-sensing field unit 602 may be composed essentially of PTFE, polypropylene, rubber, soft plastic, or the like. The difference in flexibility between the base 608 and the body 612 allows the body 612 to serve as a mass damping system, isolating the accelerometer 610 from vibrations caused by the mass 614.

Due to the mass damping effect of the body 612, the power supply and other resources may be increased without affecting the resonance frequency, and therefore the function, of the accelerometer 610. As such, additional external components 616, 617, 618, 619, 620, 621 may use the resources of the vibration-sensing field unit 602 via an expansion port 624 and flexible cable 613 or other flexible wiring. The additional external components 616-621, may each comprise a sensor, a circuit board (e.g., a PCB), a transmitter, a receiver, or the like. While the illustrated embodiment depicts six components 616-621 connected to the vibration-sensing field unit 602 via the expansion port 624, other embodiments of the vibration-sensing field unit system 600 may include less or more components. Further, in other embodiments, the vibration-sensing field unit 602 may comprise less or more expansion ports 624 than depicted in the illustrated embodiment. Such external components can include, for example, radio systems, additional sensors such as accelerometers or ultrasonic probes, a vibration-harvesting system for generating power from vibrational energy, or an external solar panel or other power source.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A vibration-sensing field unit comprising:
   at least one accelerometer to monitor vibrations of a machine;
   a mass comprising one or more of electronics and a power supply;
   a mount comprising a plurality of legs oriented to support mounting the field unit to the machine; and
   a mass damping system removably fastened to the mount, the mass damping system to isolate the mass from the at least one accelerometer, comprising:
      a base composed essentially of a first material to house and support the at least one accelerometer, and
      a body mounted to the base to house and support the mass, wherein the body is composed essentially of a second material that is more flexible than the first material.

2. The vibration-sensing field unit of claim 1, wherein the second material comprises at least one of: polytetrafluoroethylene; polypropylene; rubber; and acetal resin.

3. The vibration-sensing field unit of claim 1, further comprising an expansion port integrated with the body.

4. The vibration-sensing field unit of claim 3, further comprising:
   at least one sensor component external to the base and body and coupled to the vibration-sensing field unit via the expansion port and a flexible cable.

5. The vibration-sensing field unit of claim 1, wherein the mass comprises a battery-based power supply for the vibration-sensing field unit.

6. The vibration-sensing field unit of claim 1, further comprising an ultrasonic transducer mounted and supported with the accelerometer at the base.

7. The vibration-sensing field unit of claim 1, wherein the mass comprises electronics comprising at least one of: a temperature sensor, a radio, and a memory store.

8. The vibration-sensing field unit of claim 1, wherein the mass comprises electronics comprising a wireless transmitter to communicate information related to machine parameters of the machine with a base station.

9. The vibration-sensing field unit of claim 1, wherein the body comprises at least one shock-absorbing pillar coupled between the mass and the base.

10. The vibration-sensing field unit of claim 1, wherein a first resonance frequency of the accelerometer is higher than a second resonance frequency of the mass.

11. The vibration-sensing field unit of claim 1, wherein the mass comprises electronics comprising:
   a cooling system to cool the field unit.

12. A vibration-sensing field unit comprising:
   at least one accelerometer to monitor vibrations of a machine;
   at least one ultrasonic transducer to monitor sounds of the machine;
   a mass comprising one or more of electronics and a power supply; and
   a mass damping system to isolate the mass from the accelerometer to enable the accelerometer to sense resonance frequencies higher than the resonance frequency of the mass, comprising:
      a base composed essentially of a first material to house and support the at least one accelerometer and the at least one ultrasonic transducer, wherein the at least one accelerometer and the at least one ultrasonic transducer are seated in the base, and
      a body mounted to the base to house and support the mass, wherein the body is composed essentially of a second material that is more flexible than the first material.

13. The vibration-sensing field unit of claim 12, wherein the mass comprises a battery-based power supply for the vibration-sensing field unit.

14. The vibration-sensing field unit of claim 12, wherein the second material comprises at least one of: polytetrafluoroethylene; polypropylene; rubber; and acetal resin.

15. The vibration-sensing field unit of claim 12, further comprising an expansion port integrated with the body.

16. The vibration-sensing field unit of claim 15, further comprising:
   at least one sensor component external to the base and body and coupled to the vibration-sensing field unit via the expansion port and a flexible cable.

17. The vibration-sensing field unit of claim 12, further comprising a mount comprising a plurality of legs oriented to support mounting the vibration-sensing field unit to the machine.

18. The vibration-sensing field unit of claim 12, wherein the mass comprises electronics comprising at least one of: a temperature sensor, a radio, and a memory store coupled to the base.

19. The vibration-sensing field unit of claim 12, wherein the mass comprises electronics comprising a wireless transmitter to communicate information related to machine parameters of the machine with a base station.

20. The vibration-sensing field unit of claim 12, wherein a first resonance frequency of the accelerometer is higher than a second resonance frequency of the mass.

* * * * *